(12) United States Patent
Chung et al.

(10) Patent No.: US 10,116,824 B2
(45) Date of Patent: Oct. 30, 2018

(54) METHOD AND IMAGE FORMING APPARATUS FOR GENERATING WORKFLOW OF IMAGE FORMING JOB

(71) Applicant: S-Printing Solution Co., Ltd., Suwon-si, Gyeonggi-do (KR)

(72) Inventors: Yong-goo Chung, Seoul (KR); Hye-heon Jung, Gimpo-si (KR); Yoo-ri Kim, Incheon (KR); Sun-young Moon, Seoul (KR); Hyung-jong Kang, Seoul (KR); Sang-eun Park, Suwon-si (KR); Chang-wook Yoon, Hwaseong-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 36 days.

(21) Appl. No.: 15/158,203

(22) Filed: May 18, 2016

(65) Prior Publication Data

US 2017/0064120 A1    Mar. 2, 2017

(30) Foreign Application Priority Data

Aug. 25, 2015  (KR) ........................ 10-2015-0119821

(51) Int. Cl.
*H04N 1/00* (2006.01)
*G06F 3/12* (2006.01)

(52) U.S. Cl.
CPC ....... *H04N 1/00949* (2013.01); *G06F 3/1204* (2013.01); *G06F 3/1208* (2013.01); *G06F 3/1258* (2013.01); *G06F 3/1271* (2013.01); *G06F 3/1275* (2013.01); *H04N 1/00411* (2013.01); *H04N 2201/0094* (2013.01)

(58) Field of Classification Search
CPC . G06K 15/1856; G06F 3/1208; G06F 3/1275; H04N 1/00949
See application file for complete search history.

(56) References Cited

U.S. PATENT DOCUMENTS

| | | | |
|---|---|---|---|
| 8,305,600 B2 | 11/2012 | Kayama | |
| 2003/0046143 A1 | 3/2003 | Nakagawa et al. | |
| 2003/0103232 A1* | 6/2003 | Twede | G06F 3/1204 358/1.15 |
| 2004/0059716 A1* | 3/2004 | Shiraishi | G06F 17/30011 |
| 2005/0243365 A1* | 11/2005 | Noda | G06F 3/1262 358/1.15 |

(Continued)

FOREIGN PATENT DOCUMENTS

| | | |
|---|---|---|
| JP | 2003-177879 | 6/2003 |
| JP | 2006-099738 A | 4/2006 |

(Continued)

*Primary Examiner* — Nicholas Pachol
(74) *Attorney, Agent, or Firm* — Jefferson IP Law, LLP

(57) ABSTRACT

A method of generating a workflow of an image forming job is provided. The method includes providing a list of selectable first functions, receiving a user input for selecting a first function from the list of first functions, providing a list of second functions that are continuously executable to the selected first function by using information about output data of the selected first function, receiving a user input for selecting a second function from the list of second functions, and generating a workflow defined to sequentially execute the selected first function and second function.

19 Claims, 11 Drawing Sheets

(56) References Cited

U.S. PATENT DOCUMENTS

| | | | |
|---|---|---|---|
| 2006/0028667 A1 | 2/2006 | Saito | |
| 2006/0044612 A1* | 3/2006 | Kayama | G06F 3/1204 358/1.15 |
| 2006/0197977 A1* | 9/2006 | Miyata | G06F 3/1204 358/1.15 |
| 2008/0002220 A1 | 1/2008 | Song | |
| 2010/0046023 A1 | 2/2010 | Hong | |
| 2011/0181900 A1* | 7/2011 | Suese | H04N 1/00413 358/1.13 |
| 2011/0296439 A1* | 12/2011 | Kozaki | H04N 1/00933 719/318 |
| 2012/0005378 A1* | 1/2012 | Abe | G06F 13/102 710/18 |
| 2012/0030329 A1* | 2/2012 | Aoki | H04N 1/00347 709/223 |
| 2012/0079409 A1* | 3/2012 | Luo | G06F 8/36 715/772 |
| 2012/0117570 A1* | 5/2012 | Ozaki | G06Q 10/06 718/102 |
| 2012/0218591 A1 | 8/2012 | Dumitrescu et al. | |
| 2013/0198750 A1* | 8/2013 | Charif | G06F 8/20 718/102 |
| 2013/0222829 A1 | 8/2013 | Nakashima | |
| 2013/0326526 A1* | 12/2013 | Sasaki | G06F 9/46 718/102 |
| 2016/0182757 A1* | 6/2016 | Yoo | H04N 1/00957 358/1.15 |
| 2016/0182762 A1* | 6/2016 | Eum | H04N 1/4413 358/1.14 |

FOREIGN PATENT DOCUMENTS

| | | |
|---|---|---|
| JP | 2008-146606 | 6/2008 |
| JP | 2012-032845 A | 2/2012 |
| KR | 10-2002-0031189 A | 4/2002 |

* cited by examiner

FIG. 6

METHOD AND IMAGE FORMING APPARATUS FOR GENERATING WORKFLOW OF IMAGE FORMING JOB

CROSS-REFERENCE TO RELATED APPLICATION(S)

This application claims the benefit under 35 U.S.C. § 119(a) of a Korean patent application filed on Aug. 25, 2015 in the Korean Intellectual Property Office and assigned Serial number 10-2015-0119821, the entire disclosure of which is hereby incorporated by reference.

TECHNICAL FIELD

The present disclosure relates to a method and an image forming apparatus for generating a workflow of an image forming job.

BACKGROUND

Image forming apparatuses include individual apparatuses such as printers, scanners, copy machines, and fax machines and multi-function products (MFPs) in which various functions of such different apparatuses are integrated into one apparatus. An image forming apparatus may include a user interface (UI) for a user to control an operation of the image forming apparatus or to input data. Since functions provided by image forming apparatuses differ from each other according to types of the image forming apparatuses, forms of UIs may differ from each other. Along with the development of scientific technology, hardware and software used for image forming apparatuses also have been significantly developed, and UIs of the image forming apparatuses also have evolved.

In addition, image forming apparatuses may have various functions besides a print function. For example, the image forming apparatuses may have a scan function, a copy function, a facsimile function, an e-mail transfer function, a storing function, a character recognition function, a file transfer protocol (FTP) function, and the like.

There is a need for methods of easily providing various functions of an image forming apparatus to a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an image forming apparatus for generating a workflow of an image forming job.

Another aspect of the present disclosure is to provide a non-transitory computer-readable recording medium having recorded thereon a computer-executable program for performing the method.

In accordance with an aspect of the present disclosure, a method of generating a workflow of an image forming job is provided. The method includes providing a list of selectable first functions, receiving a user input for selecting any one first function from the list of first functions, providing a list of second functions that are continuously executable to the selected first function by using information about output data of the selected first function, receiving a user input for selecting any one second function from the list of second functions, and generating a workflow defined to sequentially execute the selected first function and second function.

The providing of the list of selectable first functions may include acquiring metadata of applications for executing the first functions, and analyzing the acquired metadata and displaying first functions, which are usable for constituting the workflow, in the list of first functions.

The providing of the list of first functions may include displaying first functions for which input data is not required in the list of first functions and second functions for which output data is not required in the list of second functions, based on function information acquired from metadata of applications for executing the first functions or the second functions.

The function information about the first functions or the second functions may include names of the first functions or the second functions, information about output data, information about input data, and icons.

The providing of the list of second functions may include displaying second functions having information about input data corresponding to output data of the first functions, in the list of second functions.

In the list of second functions, the second functions having the information about the input data corresponding to the output data of the first functions may be displayed as an activated state, and the other second functions may be displayed as a deactivated state.

The method may further include running an application for executing the selected first function or second function, receiving setting values for the selected first function or second function from a user through the application being run, and storing a workflow including the setting values for the selected first function or second function.

The storing of the workflow may include storing the workflow in any one of a private storage of the user or a public storage.

The method may further include reading the stored workflow if an execution request for the stored workflow is acquired, and sequentially executing the functions included in the workflow.

In accordance with another aspect of the present disclosure, an image forming apparatus for generating a workflow of an image forming job is provided. The image forming apparatus includes a user interface (UI) unit configured to provide a list of selectable first functions and a list of second functions and receive, from a user, a user input for selecting any one first function from the list of first functions and a user input for selecting any one second function from the list of second functions, a controller configured to determine a list of second functions that are continuously executable to the selected first function by using information about output data of the selected first function in order to provide the list of second functions, and a storage configured to store a workflow defined to sequentially execute the selected first function and second function.

The controller may be further configured to control acquiring metadata of applications for executing the first functions and analyzing the acquired metadata to display first functions, which are usable for constituting the workflow, in the list of first functions.

The controller may be further configured to control displaying first functions for which input data is not required in the list of first functions and second functions for which output data is not required in the list of second functions, based on function information acquired from metadata of applications for executing the first functions or the second functions.

The function information about the first functions or the second functions may include names of the first functions or the second functions, information about output data, information about input data, and icons.

The controller may be further configured to control displaying second functions having information about input data corresponding to output data of the first functions, in the list of second functions.

The controller may be further configured to control displaying the second functions having the information about the input data corresponding to the output data of the first functions as an activated state and displaying the other second functions as a deactivated state, in the list of second functions.

The controller may be further configured to run an application for executing the selected first function or second function, the UI unit may be further configured to receive setting values for the selected first function or second function from a user through the application being run, and the storage may be further configured to store a workflow including the setting values for the selected first function or second function.

The storage may be further configured to store the workflow in any one of a private storage of the user or a public storage.

The controller may be further configured to read the stored workflow if an execution request for the stored workflow is acquired and sequentially execute the functions included in the workflow.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a list of workflows generated by an image forming apparatus according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

When terms such as "consist of" or "include" are used in the present specification, such terms that can be taken to mean all of several components or operations disclosed in the specification are necessarily included, and some components or operations thereof may not be included, or additional components or operations may be further included.

In addition, although terms including ordinal numbers, such as "first" and "second", used in the present specification may be used to describe various elements, the elements are not limited by such terms. The terms are only used to classify a certain element from another element.

The present embodiments relate to a device for supporting a cloud print service and a method of providing the cloud print service, and thus, a detailed description of the features well known to those of ordinary skill in the art to which the embodiments below belong will be omitted.

Figure 1:
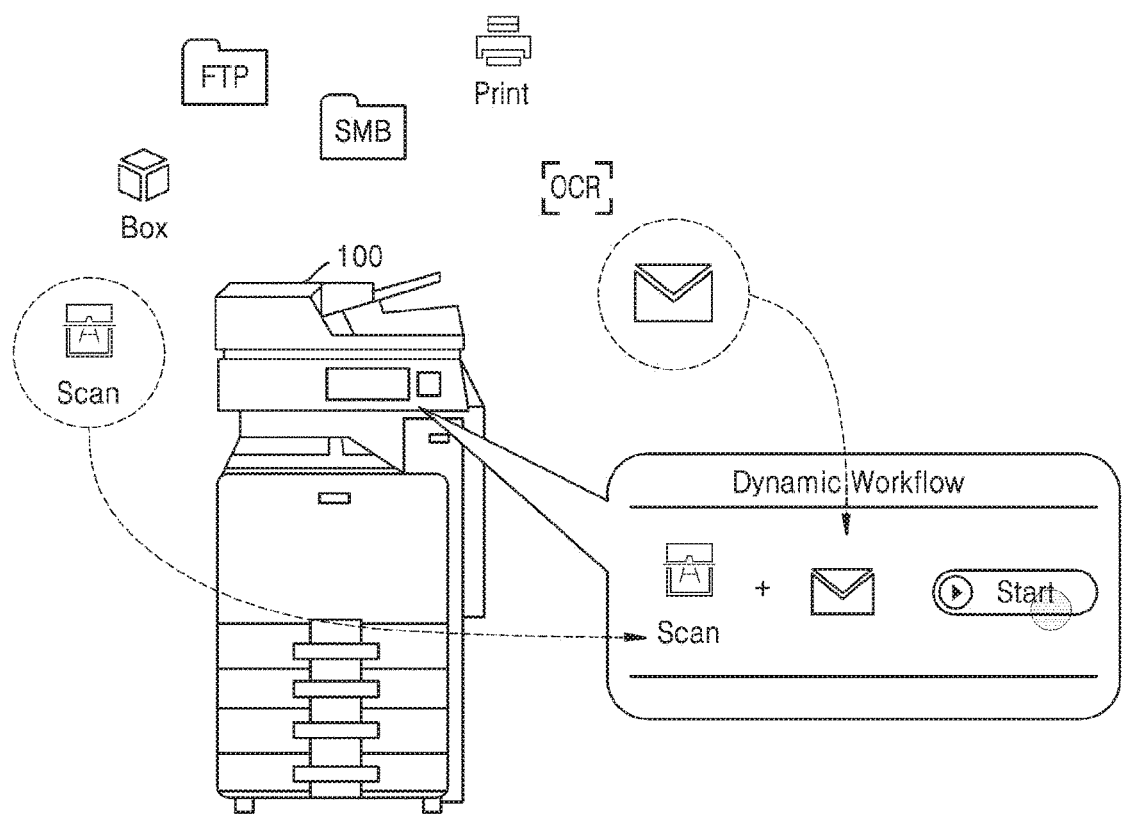
FIG. 1 illustrates an image forming apparatus for generating a workflow according to an embodiment of the present disclosure.

FIG. 1 illustrates an image forming apparatus for generating a workflow according to an embodiment of the present disclosure.

Referring to FIG. 1, in an image forming apparatus 100 according to an embodiment of the present disclosure, a user may generate and manage a workflow of an image forming job through a user interface (UI). Herein, the workflow is to define the contents and an execution order of a job by using various functions provided by the image forming apparatus 100.

The image forming apparatus 100 may be a device, such as a printer, a scanner, a fax machine, or a multi-function product (MFP), supporting the execution of image forming jobs such as scanning, printing, and fax transmission and reception and may provide various functions, for example, a print function, a scan function, a copy function, a facsimile function, an e-mail transfer function, a storing function, a character recognition function, and a file transfer protocol (FTP) function. The image forming apparatus 100 may also provide monitoring functions periodically executable without a user's request, such as a toner remaining amount monitoring function.

The user may generate a workflow by combining various functions in a desired order through the image forming apparatus 100. For example, the user may sequentially select the scan function and the e-mail transfer function so as to scan a document and to transmit image data through an e-mail. The image forming apparatus 100 may receive an input of the user and generate and store a first workflow in which the scan function and the e-mail transfer function are combined so as to be sequentially executed.

The user may quickly and easily use various functions provided by the image forming apparatus 100, by selecting workflows stored in the image forming apparatus 100. In addition, the image forming apparatus 100 may provide a list of selectable functions to the user through a UI such that the user easily generates and manages workflows.

More specifically, when a first workflow defined to sequentially execute a first function and a second function is generated, the image forming apparatus 100 may provide a list of selectable first functions to the user through a UI. The image forming apparatus 100 may determine functions usable for constituting a workflow by acquiring and analyzing metadata of applications for executing various functions. For example, the image forming apparatus 100 may provide functions having output data to be generated as an execution result of a function to the list of first functions by analyzing the metadata.

In addition, the image forming apparatus 100 may provide a list of second functions that are continuously executable to a first function selected by the user from the list of first functions, by using information about the selected first function. For example, the image forming apparatus 100 may use information about output data of the selected first function. The image forming apparatus 100 may provide second functions having information about input data corresponding to the information about the output data of the selected first function to the list of second functions. Alternatively, the image forming apparatus 100 may provide, to the list of second functions, functions requiring input data to execute a function.

The image forming apparatus 100 may generate and store a first workflow defined to sequentially execute the selected first function and second function by receiving a user input for selecting any one second function from the list of second functions.

Figure 2:
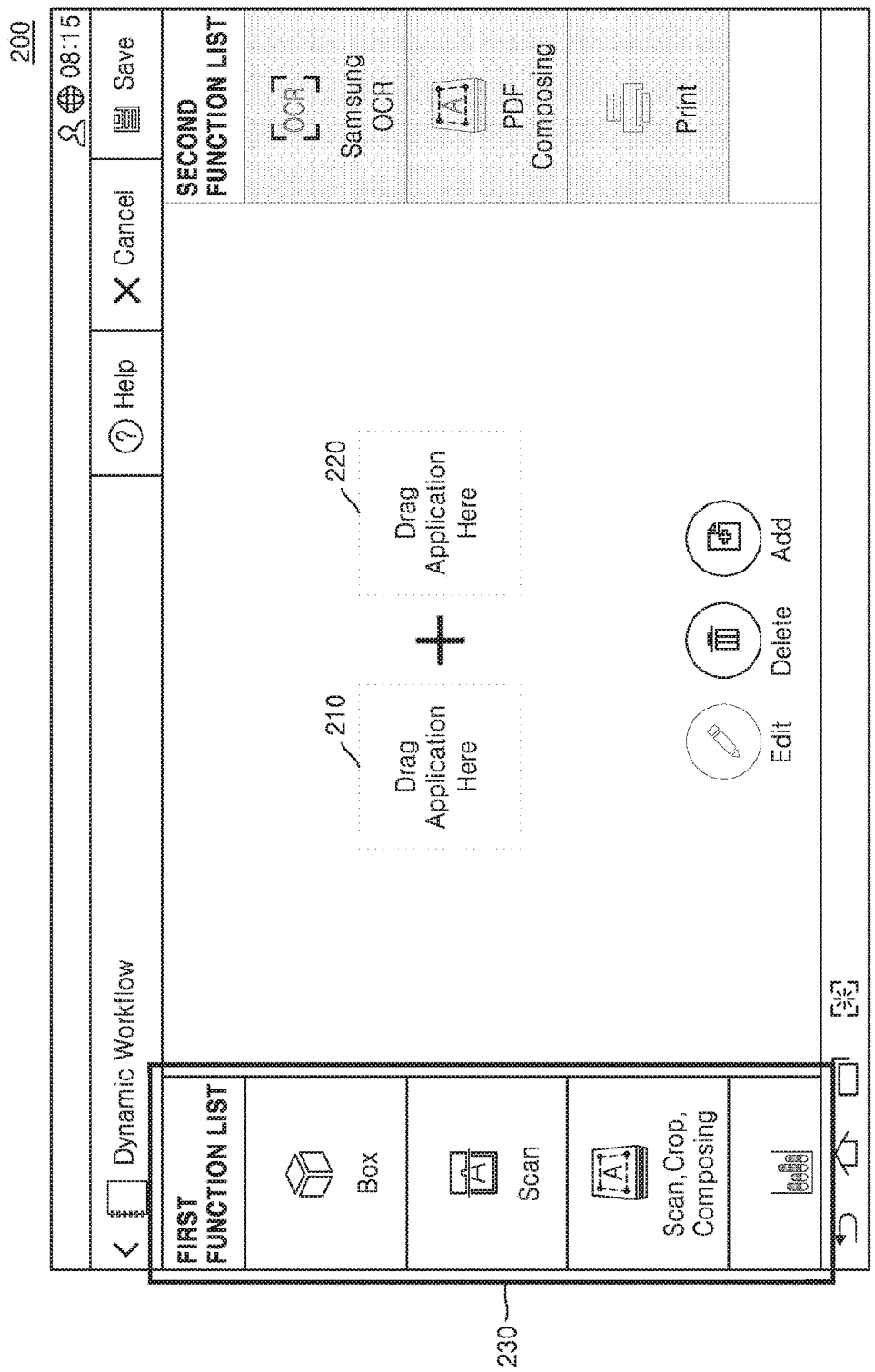
FIGS. 2 to 4 illustrate an operation by which an image forming apparatus generates a workflow according to an embodiment of the present disclosure.
Figure 3:
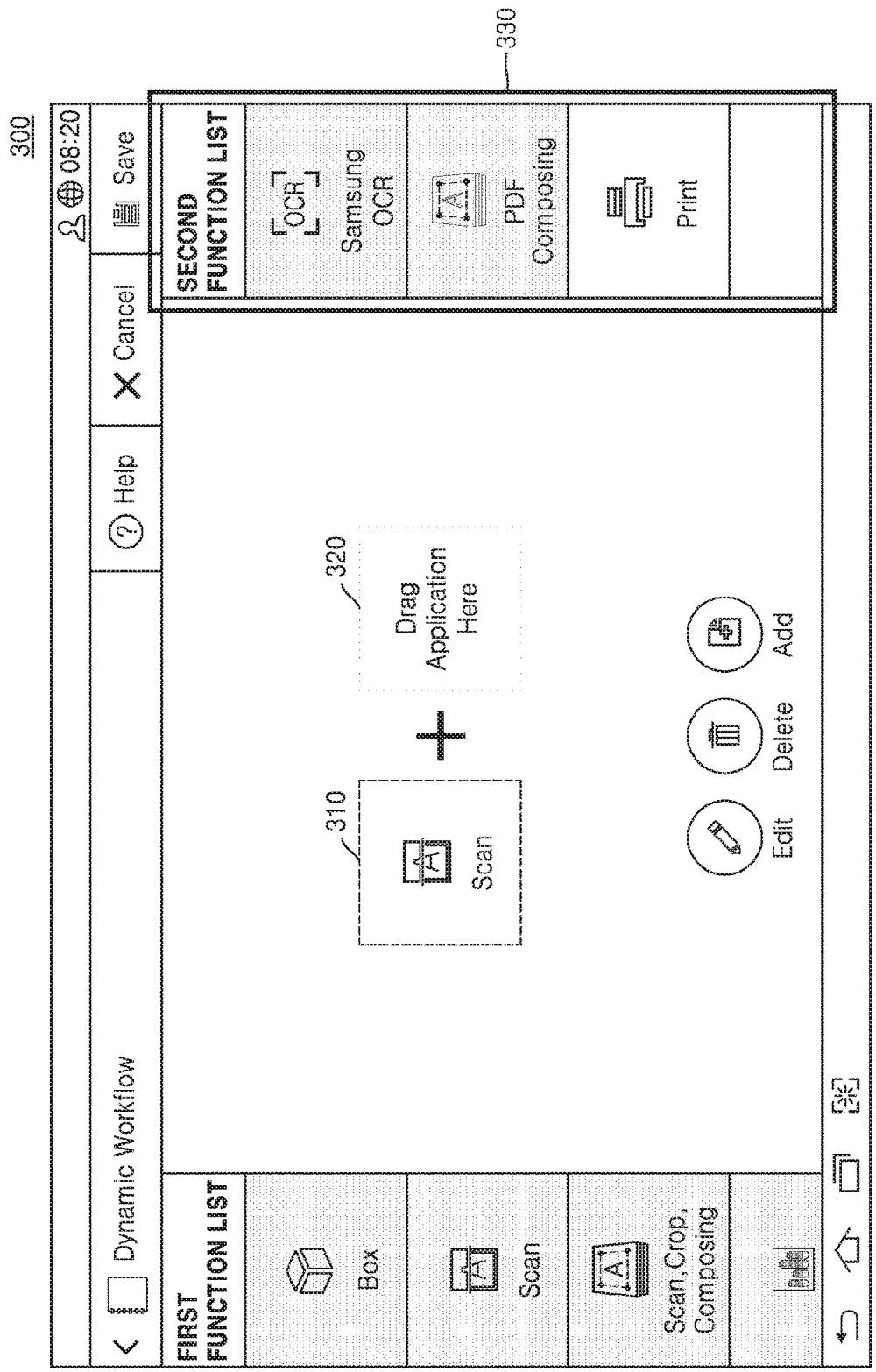
Figure 4:
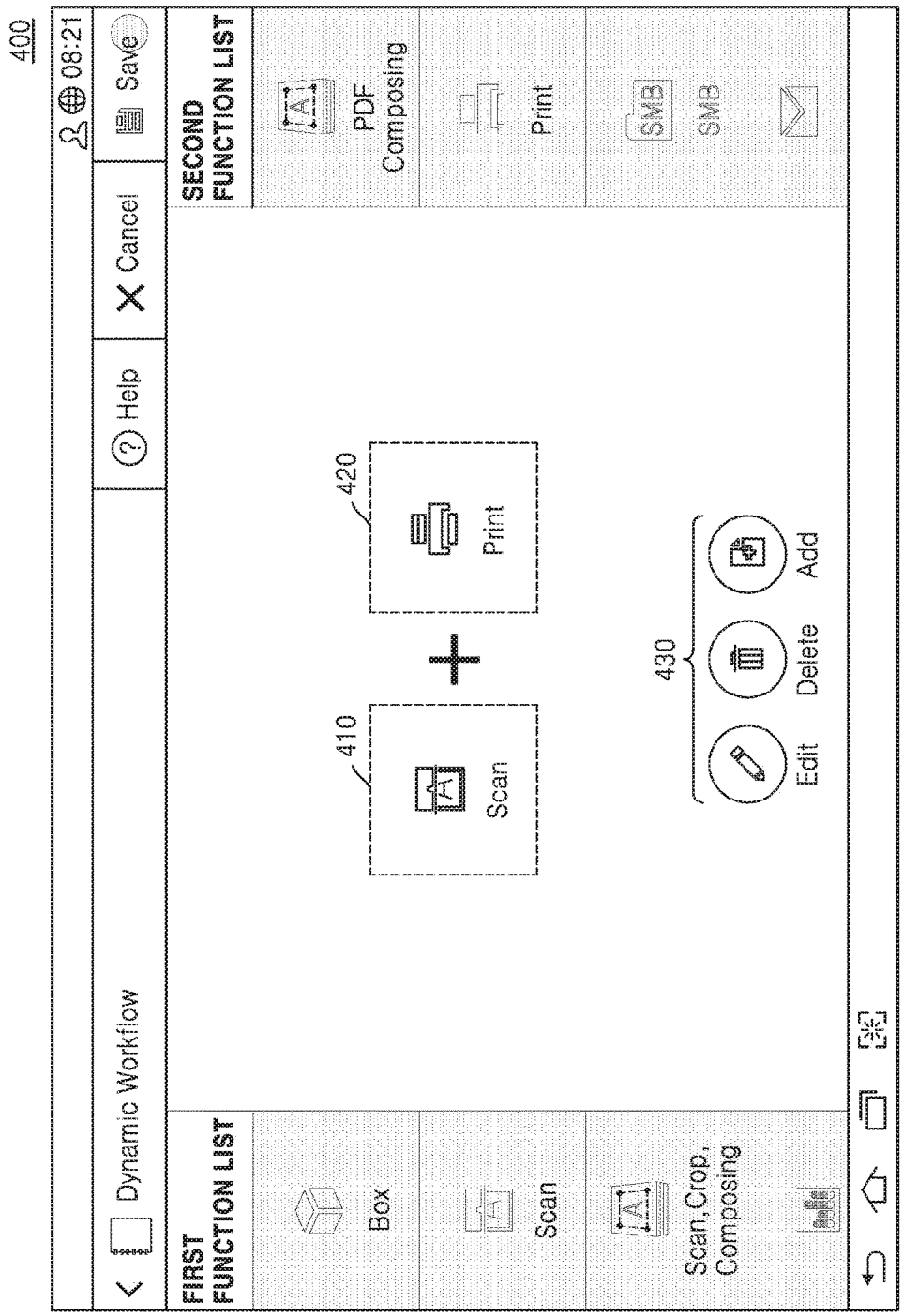

FIGS. 2 to 4 illustrate an operation by which an image forming apparatus generates a workflow according to an embodiment of the present disclosure.

The operation shown in FIGS. 2 to 4 may be performed through an application (dynamic workflow (DW) application) installed in the image forming apparatus 100 to generate a workflow. For example, a screen image 200 of FIG. 2 is an example of an execution screen image of the DW application installed in the image forming apparatus 100.

Referring to FIG. 2, the user may select a first function 210 and a second function 220 to be included in a first workflow on the image forming apparatus 100. However, the present embodiment is not limited thereto, and when a workflow including three or more functions is generated, the user may select more functions on the image forming apparatus 100.

First functions and second functions are various functions providable by the image forming apparatus 100 and may include, for example, a print function, a scan function, a copy function, a facsimile function, an e-mail transfer function, a storing function, a character recognition function, and an FTP function. The image forming apparatus 100 may transmit job data to various network servers such as an FTP server and a server message block (SMB) server, a user terminal, or another image forming apparatus through wired and/or wireless network connection. However, the first functions and the second functions are not limited to the examples described above and may include various functions executable by applications installed in the image forming apparatus 100. Each of the applications installed in the image forming apparatus 100 may perform one or more functions.

The image forming apparatus 100 may determine functions usable for constituting a workflow through the DW application among the various functions provided by the image forming apparatus 100. For example, the image forming apparatus 100 may determine usable functions by acquiring and analyzing metadata of applications for executing various functions, which are installed in the image forming apparatus 100. The image forming apparatus 100 may provide the determined usable functions to a first function list or a second function list.

The image forming apparatus 100 may acquire information about each function by analyzing metadata of applications. For example, the information about each function may include a name of the function, information about input data of the function, information about output data, icon information, and the like.

For example, with respect to "scan function" executed by a scan application, information about output data of the function may include, for example, a jpg format as information indicating a file format which may be scanned image data. In addition, information about "scan function" may not include information about input data. For example, "scan function" does not require input data.

In addition, with respect to "print function" executed by a print application, information about input data of the function may include, for example, a pdf format as information indicating a file format which is printable by the image forming apparatus 100. In addition, information about "print function" may not include information about output data. For example, "print function" does not require output data.

In addition, "box function" may include a function of storing data in the image forming apparatus 100 or reading data stored in the image forming apparatus 100. With respect to "box function", information about input data of the function may include, for example, a pdf format as information indicating a file format which is storable in the image forming apparatus 100. In addition, information about output data of "box function" may include a pdf format or the like as information indicating a file format which is readable from the image forming apparatus 100.

In addition, information about input data of "FTP function" may indicate a file format which may be transmittable to an FTP server, and information about output data of "FTP function" may not be included.

In addition, information about input data of "character recognition function" may include, for example, a pdf format as information indicating a file format which may be a target for which character recognition is to be performed. In addition, information about output data of "character recognition function" may include, for example, a doc format as information indicating a file format of data for which character recognition has been performed.

In addition, the monitoring functions may include "toner remaining amount monitoring function" and the like. For example, output data of "toner remaining amount monitoring function" may indicate a monitoring result, and input data thereof may not be included.

The present embodiment is not limited to the examples described above, and the image forming apparatus 100 may acquire information about various functions.

The image forming apparatus 100 may provide a first function list or a second function list to the user by using the acquired information about each function. The user may select a first function or a second function for constituting a workflow from the provided first function list or second function list.

For example, referring to FIG. 2, the image forming apparatus 100 may provide a first function list 230 to the user through the DW application. In other words, the image forming apparatus 100 may provide the list 230 of usable first functions determined based on information about functions. The image forming apparatus 100 may provide the first function list 230 by displaying the determined usable first functions as an activated state among all the functions.

The image forming apparatus 100 may provide, to the first function list 230, all first functions usable for constituting a workflow. Alternatively, the image forming apparatus 100 may provide, to the first function list 230, first functions for which input data is not required. Alternatively, the image forming apparatus 100 may provide, to the first function list 230, first functions which result in output data.

Alternatively, the image forming apparatus 100 may provide, to the first function list 230, first functions restricted according to rights of the user.

The user may select any one first function from the first function list 230. For example, the user may select the scan function by touching and dragging a scan function icon in the first function list 230 on the screen image 200 to a location of the first function 210.

The image forming apparatus 100 may display the selected scan function icon on the location of the first function 210. Referring to FIG. 3, an icon of "scan function" is displayed on the location of the first function 210. In this case, if the first function 210 is selected, the image forming apparatus 100 may deactivate (shade) the functions in the first function list 230.

Referring to FIG. 3, the image forming apparatus 100 may provide a list 230 of second functions that are continuously executable to a selected first function 310 by using information about the first function 310.

More specifically, the image forming apparatus 100 may acquire and use information about output data of the first function 310. The image forming apparatus 100 may determine, as selectable second functions, second functions having information about input data corresponding to the information about the output data of the first function 310 among functions which may constitute a workflow and display the determined selectable second functions in the second function list 330. For example, the image forming apparatus 100 may display the determined selectable second functions as an activated state and display the other functions as a deactivated state.

For example, referring to FIG. 3, the information about the output data of the selected first function (scan function) 310 may indicate a jpg format. In this case, the image forming apparatus 100 may determine the print function, the box function, and the like having information about input data corresponding to the jpg format as selectable second functions and display the determined selectable second functions in the second function list 330. The image forming apparatus 100 may display functions such as the character recognition function having information about input data which does not correspond to the jpg format, as a deactivated state in the second function list 330.

The image forming apparatus 100 may provide, to the second function list 330, all second functions usable for constituting a workflow. Alternatively, the image forming apparatus 100 may provide, to the second function list 330, second functions for which output data is not required. Alternatively, the image forming apparatus 100 may provide, to the second function list 330, second functions which requires input data.

Alternatively, the image forming apparatus 100 may provide, to the second function list 330, second functions restricted according to rights of the user.

The user may select any one second function from the second function list 330. For example, the user may select the print function by touching and dragging a print function icon in the second function list 330 on a screen image 300 to a location of a second function 320.

The image forming apparatus 100 may display the selected print function icon on the location of the second function 320.

Referring to FIG. 4, the image forming apparatus 100 may provide various UIs 430 for generating (adding), storing, deleting, and editing a workflow to the user and generate and manage a workflow according to an input of the user.

For example, in FIG. 4, when an input for adding a workflow is received from the user through a UI 430, the image forming apparatus 100 may generate and store a first workflow defined to sequentially execute a first function 410 and a second function 420.

In addition, the image forming apparatus 100 may dynamically display functions of applications installed in the image forming apparatus 100 by updating function lists on the screen image 200, 300, and 400 of FIGS. 2 to 4. For example, when an application having a new function is installed, the image forming apparatus 100 may dynamically add the function of the application to a first function list or a second function list and provide the updated first function list or second function list.

For example, after the screen image 200 of FIG. 2 is displayed through the DW application, a new application may be installed in the image forming apparatus 100. In this case, the image forming apparatus 100 may acquire and analyze metadata of the newly installed application.

The image forming apparatus 100 may acquire information about a function providable by the new application by analyzing the metadata. The image forming apparatus 100 may update the first function list or the second function list according to the acquired information about the function.

For example, the image forming apparatus 100 may determine a function list to be updated that is at least one of the first function list and the second function list according to the acquired information about the function. When the acquired information about the function has information about output data, the image forming apparatus 100 may update the first function list by additionally displaying the function in the first function list. In addition, when the acquired information about the function has information about input data, the image forming apparatus 100 may update the second function list by additionally displaying the function in the second function list.

In addition, when the acquired information about the function has both information about output data and information about input data, the image forming apparatus 100 may display the function in both the first function list and the second function list.

For example, when an application, such as Google Drive, for providing a cloud service, the image forming apparatus 100 may update function lists according to information about a cloud service function. Information about input data of the cloud service function may indicate a file format which is transmittable to a cloud server, and information about output data of the cloud service function may not exist. Therefore, the image forming apparatus 100 may add the cloud service function to the second function list according to the information about the cloud service function. The second function list may be updated to include an icon of the cloud service function.

Figure 5:
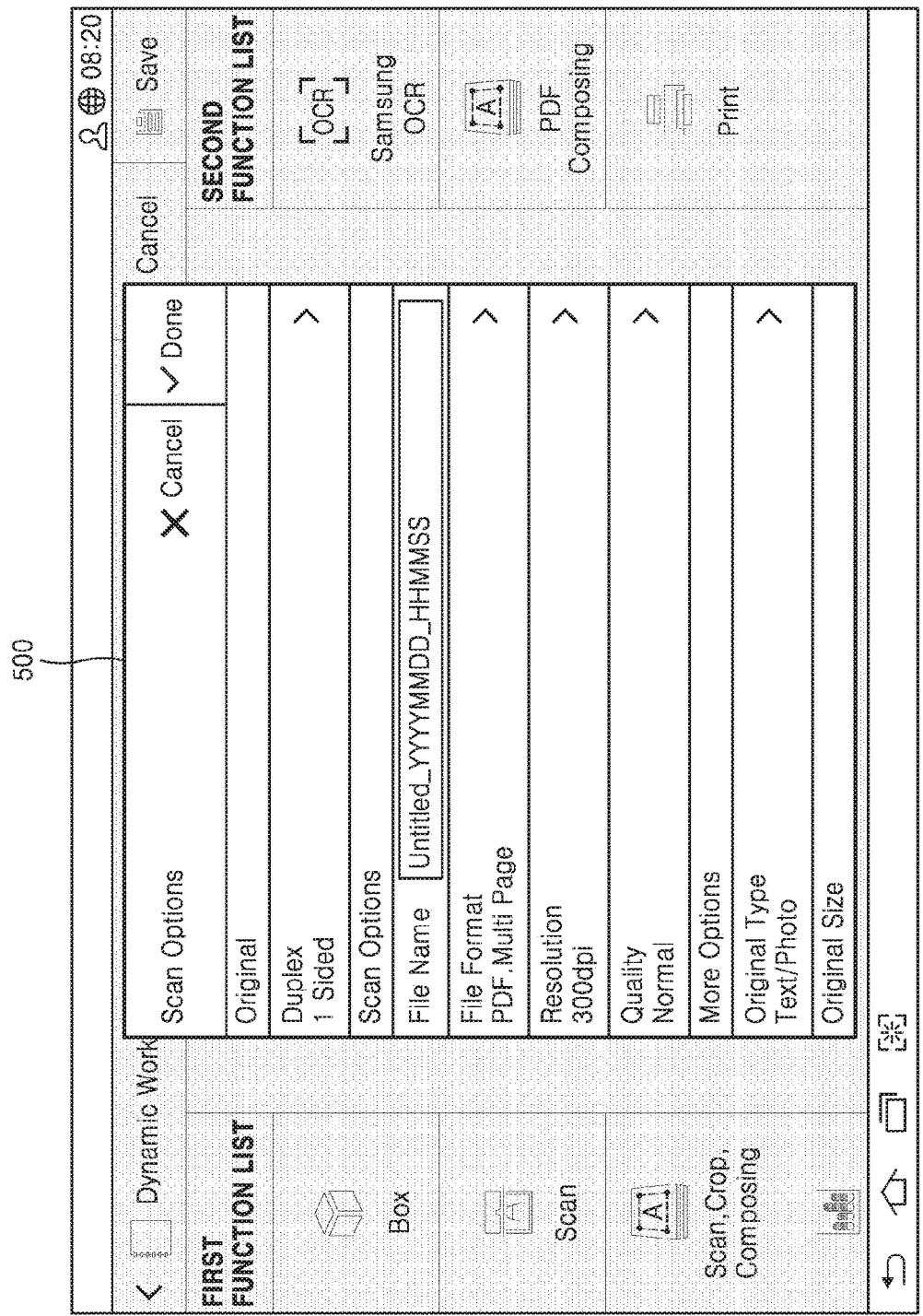
FIG. 5 illustrates a screen image for setting options of functions included in a workflow in an image forming apparatus according to an embodiment of the present disclosure.

FIG. 5 illustrates a screen image for setting options of functions included in a workflow in an image forming apparatus according to an embodiment of the present disclosure.

Referring to FIG. 5, the image forming apparatus 100 may provide a UI for setting options of functions. More specifically, when a first function is selected, the image forming apparatus 100 may run an application for executing the selected first function. The image forming apparatus 100 may receive setting values for the first function from the user through a UI for setting options provided by the application being run. When the setting values are received, the image forming apparatus 100 may end the application for executing the first function. The image forming apparatus 100 may match the received setting values with the first function.

For example, when the scan function is selected as the first function, the image forming apparatus 100 may provide a UI screen image for setting options provided by a scan application by running the scan application. The image forming apparatus 100 may receive a format, a resolution, a size, and the like of a scan file as setting values from the user through option setup corresponding to the scan function.

In addition, when a second function is selected by the user, the image forming apparatus 100 may acquire setting values corresponding to the second function through the same operation as described above.

The image forming apparatus 100 may generate and store a workflow including the received setting values individually corresponding to the first function and the second function.

Figure 6:
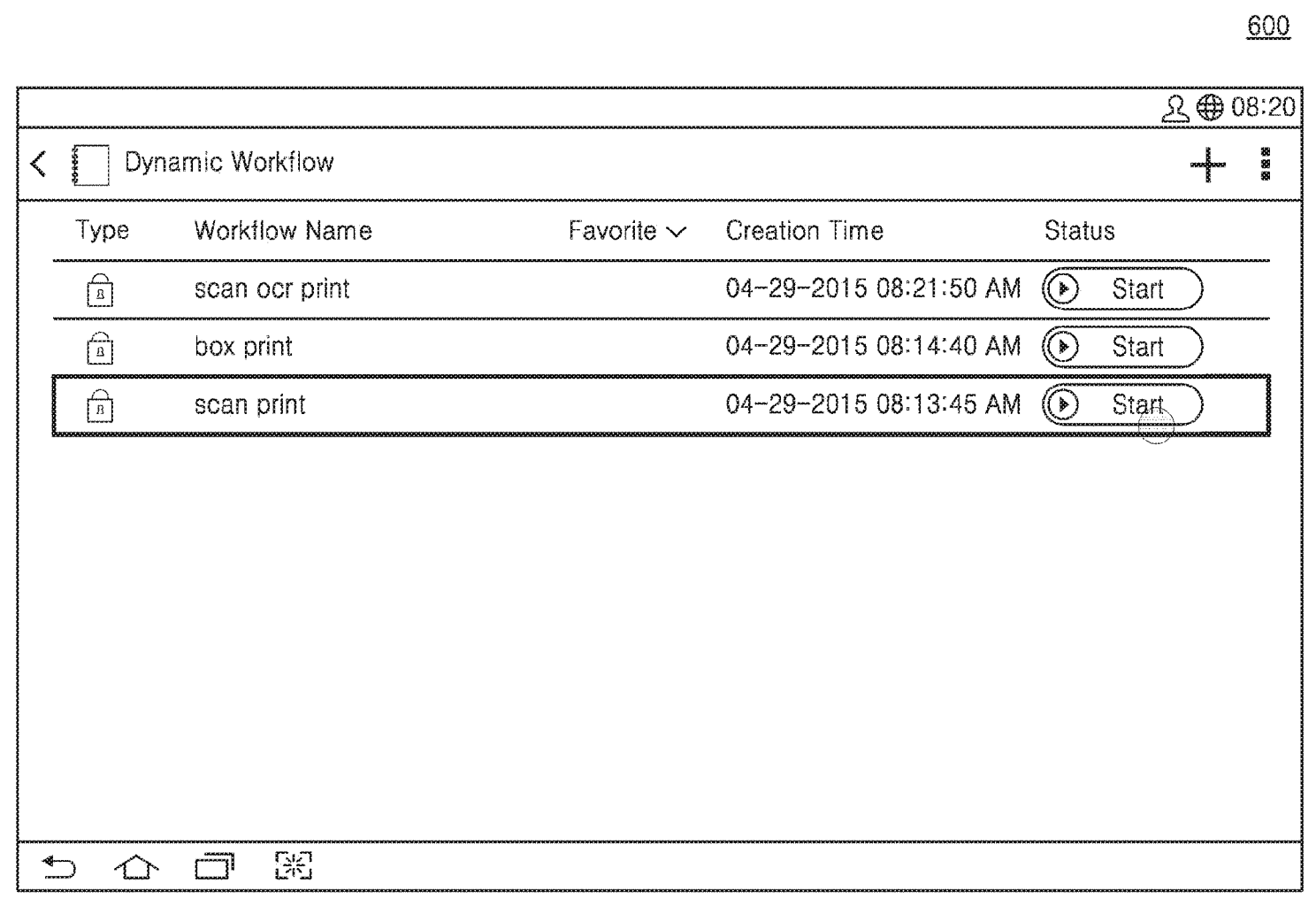

FIG. 6 illustrates a list of workflows generated by an image forming apparatus according to an embodiment of the present disclosure.

A screen image 600 of FIG. 6 is another example of an execution screen image of the DW application installed in the image forming apparatus 100.

Referring to FIG. 6, the image forming apparatus 100 may display and provide stored workflows to the user. For example, the image forming apparatus 100 may display information about names, types, creating dates, and the like of the workflows as a list.

Alternatively, the image forming apparatus 100 may selectively display workflows usable according to rights of the user among the stored workflows. For example, the image forming apparatus 100 may display the workflows usable according to rights of the user as an activated state.

The user may select any one of the displayed workflows to execute the selected workflow. The image forming apparatus 100 may sequentially execute functions included in the selected workflow. More specifically, the image forming apparatus 100 may execute the workflow by sequentially running respective applications for executing the functions included in the workflow.

In addition, the image forming apparatus 100 may execute a workflow without a selection of the user if a predefined condition is satisfied.

Figure 7:
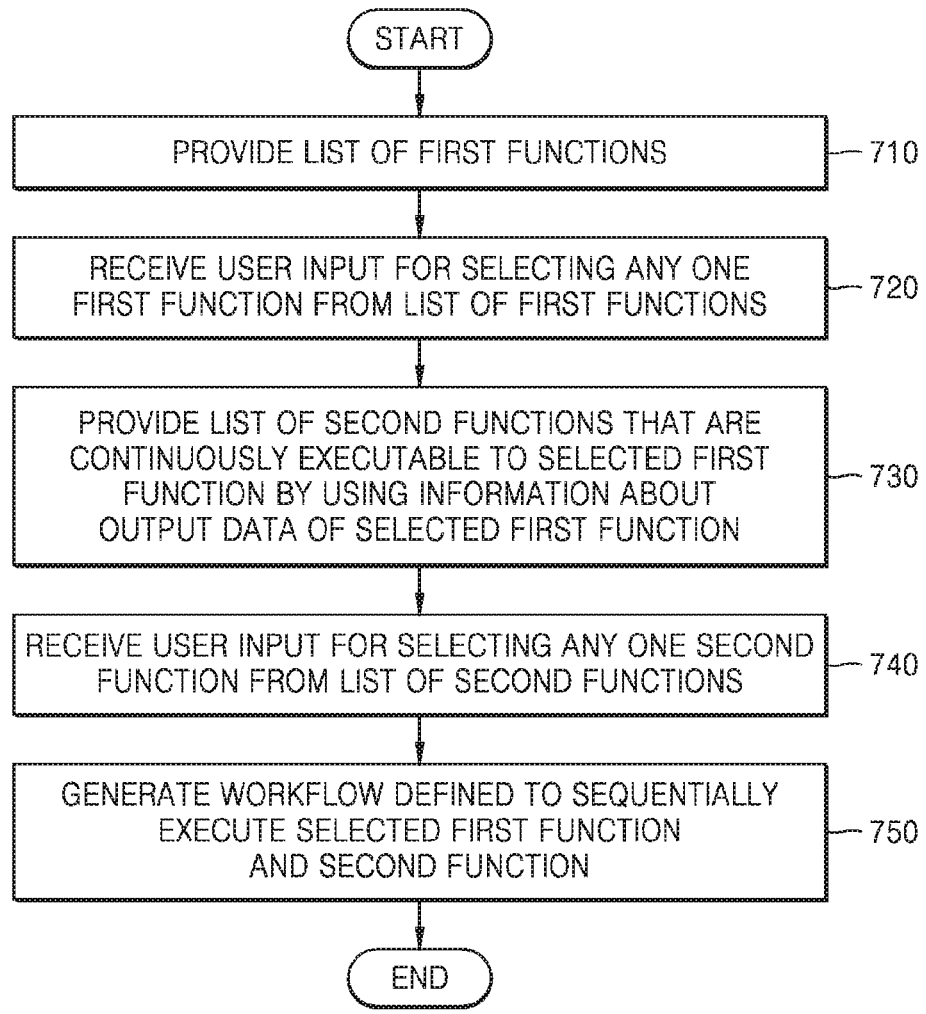
FIG. 7 illustrates a flowchart of a method by which an image forming apparatus generates a workflow according to an embodiment of the present disclosure.

FIG. 7 illustrates a flowchart of a method by which an image forming apparatus generates a workflow according to an embodiment of the present disclosure.

Referring to FIG. 7, in operation 710, the image forming apparatus 100 may provide a list of selectable first functions. For example, the image forming apparatus 100 may determine functions usable for constituting a workflow by acquiring and analyzing metadata of applications for executing various functions.

The image forming apparatus 100 may acquire information about each function by analyzing metadata of applications. For example, the information about each function may include a name of the function, information about input data of the function, information about output data, icon information, and the like.

The image forming apparatus 100 may provide a first function list to the user by using the acquired information about each function. For example, the image forming apparatus 100 may provide first functions for which input data is not required to the first function list. Alternatively, the image forming apparatus 100 may provide, to the first function list, first functions restricted according to rights of the user. The image forming apparatus 100 may provide the first function list by displaying usable first functions determined from among all functions as an activated state.

In operation 720, the image forming apparatus 100 may receive a user input for selecting any one first function from the list of first functions.

When the first function is selected, the image forming apparatus 100 may run an application for executing the first function to provide a UI for setting options provided by the application. The image forming apparatus 100 may receive setting values of options corresponding to the first function from the user through the provided UI.

In operation 730, the image forming apparatus 100 may provide a list of second functions that are continuously executable to the selected first function by using information about output data of the selected first function.

More specifically, the image forming apparatus 100 may acquire and use the information about the output data of the first function. The image forming apparatus 100 may determine, as selectable second functions, second functions having information about input data corresponding to the information about the output data of the first function among functions which may constitute a workflow, and display the determined selectable second functions in the second function list. For example, the image forming apparatus 100 may display the determined selectable second functions as an activated state and display the other functions as a deactivated state.

Alternatively, the image forming apparatus 100 may provide, to the second function list, all second functions usable for constituting a workflow. Alternatively, the image forming apparatus 100 may provide, to the second function list, second functions for which output data is not required. Alternatively, the image forming apparatus 100 may provide, to the second function list, second functions restricted according to rights of the user.

In operation 740, the image forming apparatus 100 may receive a user input for selecting any one second function from the list of second functions.

When the second function is selected, the image forming apparatus 100 may run an application for executing the second function to provide a UI for setting options provided by the application. The image forming apparatus 100 may receive setting values of options corresponding to the second function from the user through the provided UI.

In operation 750, the image forming apparatus 100 may generate and store a workflow defined to sequentially execute the selected first function and second function.

The image forming apparatus 100 may provide various UIs for generating (adding), storing, deleting, and editing a workflow to the user and generate and manage a workflow according to an input of the user.

In addition, the image forming apparatus 100 may generate and store a workflow including additionally received setting values individually corresponding to the first function and the second function.

Figure 8:
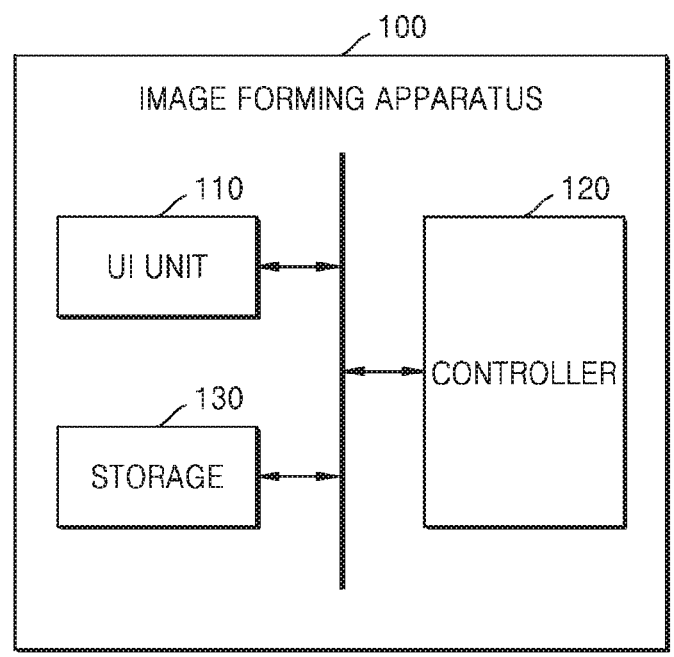
FIG. 8 illustrates a block diagram of an image forming apparatus for generating a workflow according to an embodiment of the present disclosure.

FIG. 8 illustrates a block diagram of an image forming apparatus for generating a workflow according to an embodiment of the present disclosure.

Referring to FIG. 8, the image forming apparatus 100 according to an embodiment may include a UI unit 110, a controller 120, and a storage 130. In FIG. 8, only components related to the present embodiment are shown to prevent the features of the present embodiment from being obscured. However, it will be understood by those of ordinary skill in the art that general-use hardware components other than the hard components shown in FIG. 8 may be included.

The UI unit 110 may be a hardware configuration configured to provide information to the user and receive an input from the user. The UI unit 110 may include a display having a display function, such as a monitor, a touchscreen, a liquid crystal display (LCD), or light-emitting diodes (LEDs), and an input device having an input function, such as a touch panel, a keyboard, a mouse, and a physical button.

The UI unit 110 may provide a first function list and a second function list to the user and receive user inputs for selecting a first function and a second function.

In addition, when a user input for selecting a first function or a second function is received, the UI unit 110 may provide a UI for setting options.

In addition, the UI unit 110 may provide a list of stored workflows to the user. Alternatively, the UI unit 110 may selectively display workflows usable according to rights of the user among the stored workflows.

The controller 120 is configured to control a general operation of the image forming apparatus 100 and may include, for example, a central processing unit (CPU).

The controller 120 may execute the DW application for generating a workflow, which is installed in the image forming apparatus 100.

The controller 120 may determine first functions selected to provide the first function list. More specifically, the controller 120 may acquire information about functions and determine the first function list based on the acquired information.

In addition, the controller 120 may acquire the information about functions by acquiring and analyzing metadata of applications for respectively executing the functions. The controller 120 may integrate the acquired information about functions and store the integrated information as an extensible markup language (XML) file.

The controller 120 may provide, to the first function list, first functions for which input data is not required. Alternatively, the image forming apparatus 100 may provide, to the first function list, first functions restricted according to rights of the user. The image forming apparatus 100 may provide the first function list by displaying usable first functions determined from among all functions as an activated state.

In addition, the controller 120 may determine selectable second functions. The controller 120 may acquire information about functions and determine the second function list based on the acquired information. More specifically, the controller 120 may determine second functions that are continuously executable to a selected first function by using information about output data of the selected first function in order to provide the list of second functions.

More specifically, the controller 120 may determine, as selectable second functions, second functions having information about input data corresponding to the information about the output data of the first function among functions which may constitute a workflow, and display the determined selectable second functions in the second function list. For example, the controller 120 may display the determined selectable second functions as an activated state and display the other functions as a deactivated state.

Alternatively, the controller 120 may provide, to the second function list, all second functions usable for constituting a workflow. Alternatively, the controller 120 may provide, to the second function list, second functions for which output data is not required. Alternatively, the controller 120 may provide, to the second function list, second functions restricted according to rights of the user.

The controller 120 may generate a workflow defined to sequentially execute the selected first function and second function.

The controller 120 may generate (add), store, delete, and edit a workflow according to an input of the user.

In addition, when a workflow is selected by the user, the controller 120 may read information about the selected workflow and execute the selected workflow. The controller 120 may sequentially execute functions included in the selected workflow.

For example, when a first workflow including a first function and a second function is selected, the controller 120 may execute the first function by running an application for executing the first function and, after completing the execution of the first function, execute the second function by running an application for executing the second function.

The storage 130 is configured to store various kinds of data in order to support a cloud print service in the image forming apparatus 100 and may include, for example, a volatile memory such as random access memory (RAM), a nonvolatile memory such as read-only memory (ROM), a hard disk drive (HDD), or a solid state drive (SSD).

With respect to functions provided by the image forming apparatus 100, the storage 130 may integrate and store information about the functions which is acquired from metadata of applications for respectively executing the functions.

When a workflow is generated, the storage 130 may store information about the contents and an execution order of functions included in the workflow. When setting values corresponding to each function in the generation of the workflow is received, the storage 130 may also store the setting values in correspondence with each function.

Figure 9:
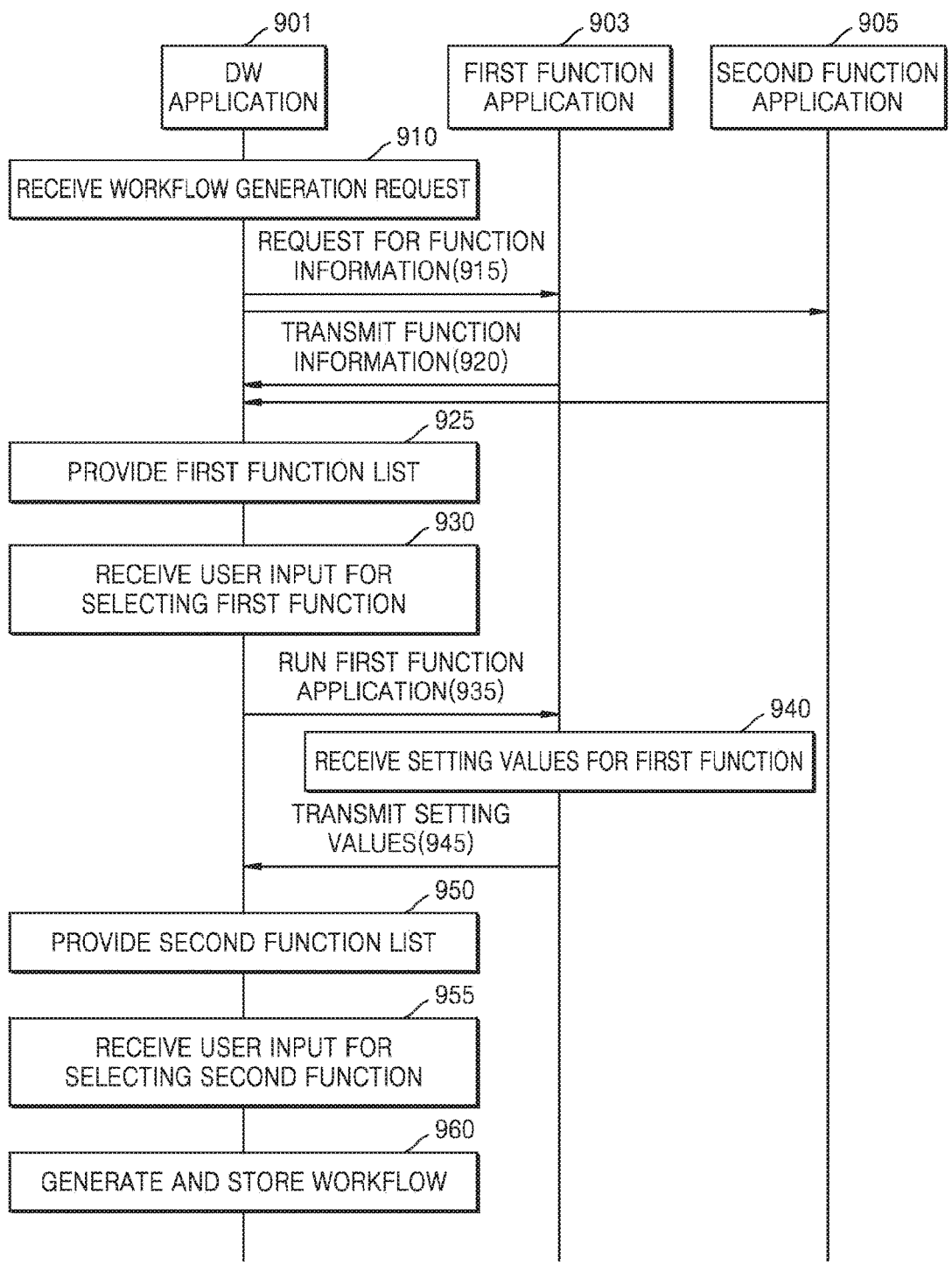
FIG. 9 illustrates a signaling diagram of a method by which an image forming apparatus generates a workflow according to an embodiment of the present disclosure.

FIG. 9 illustrates a signaling diagram of a method by which an image forming apparatus generates a workflow according to an embodiment of the present disclosure.

Referring to FIG. 9, a DW application 901, a first function application 903, and a second function application 905 may be a module for running the DW application, a module for running an application of a first function, and a module for running an application of a second function, respectively. All of the DW application 901, the first function application 903, and the second function application 905 may be installed inside the image forming apparatus 100.

When the user desires to generate a workflow, the user may run the DW application 901. The user may access a user account of the DW application 901 by inputting user identification information. The DW application 901 may restrictively provide a function of generating, managing, and executing a workflow to the user according to user rights corresponding to the user account.

In operation 910, the DW application 901 may receive a request for generating a workflow from the user.

If the request for generating a workflow is received, the DW application 901 may request the first function application 903 for information about first functions in operation 915. The DW application 901 may request a plurality of first function applications 903 for information about first functions.

In operation 920, the DW application 901 may receive information about first functions from the first function application 903.

In operation 925, the DW application 901 may provide a first function list based on the received information about first functions.

In operation 930, the DW application 901 may receive a user input for selecting any one first function from the first function list.

In operation 935, the DW application 901 may run the first function application 903 to set options corresponding to the selected first function.

In operation 940, the run first function application 903 may receive setting values corresponding to the first function from the user through a UI for option setting of the first function application 903.

In operation 945, the first function application 903 may transmit the received setting values to the DW application 901.

In operation 950, the DW application 901 may provide a second function list by using information about the first function. For example, the DW application 901 may provide, to the second function list, second functions having information about input data corresponding to information about output data of the first function.

In operation 955, the DW application 901 may receive a user input for selecting any one second function from the second function list. In this case, as described above with respect to the first function, the DW application 901 may run the second function application 905 to set options corresponding to the selected second function and receive setting values corresponding to the selected second function from the second function application 905.

In operation 960, the DW application 901 may generate and store a workflow defined to sequentially execute the selected first function and second function. When setting values corresponding to each function is received, the DW application 901 may also store the received setting values in correspondence with each function.

Figure 10:
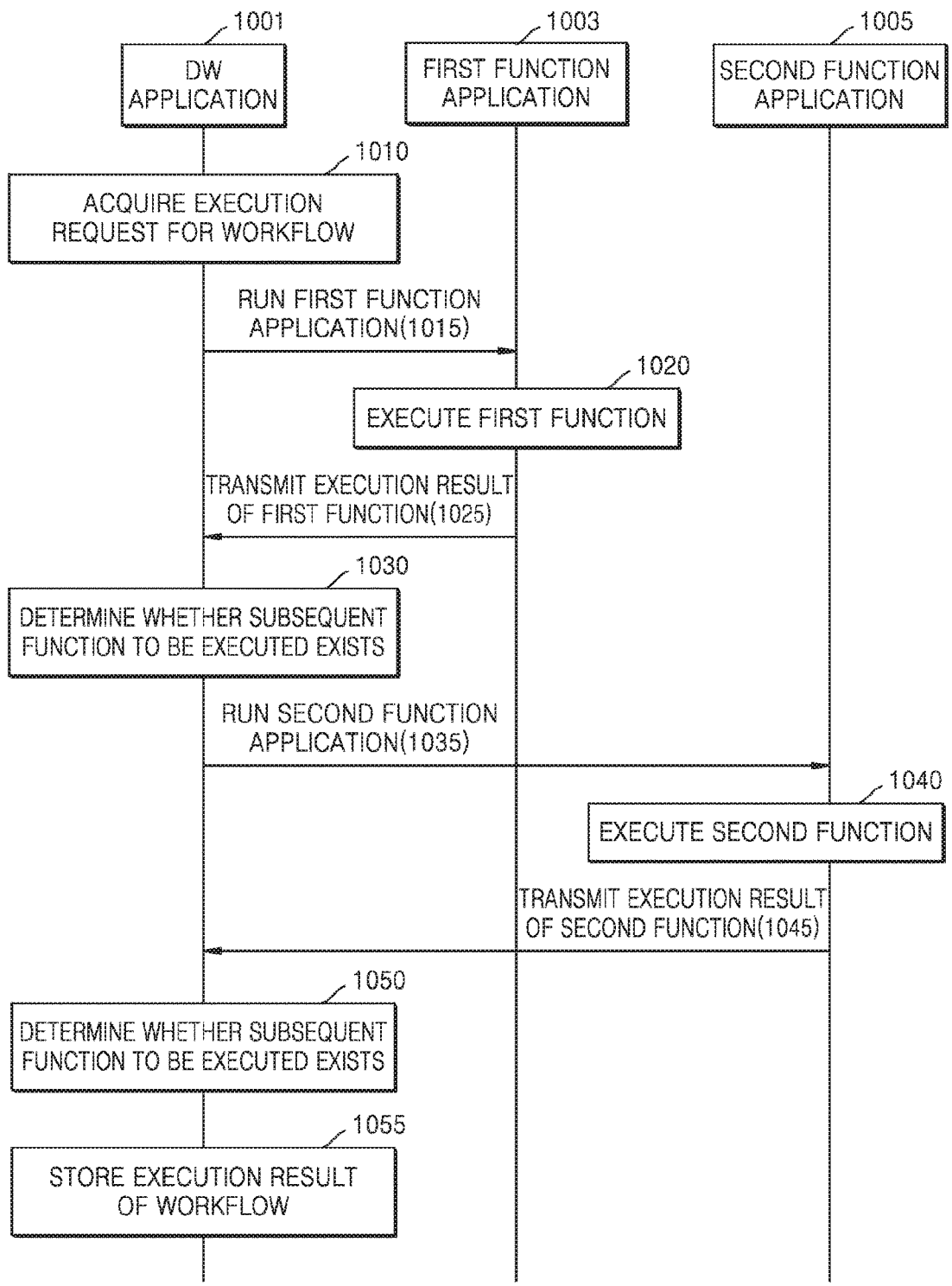
FIG. 10 illustrates a signaling diagram of a method by which an image forming apparatus executes a workflow according to an embodiment of the present disclosure.

FIG. 10 illustrates a signaling diagram of a method by which an image forming apparatus executes a workflow according to an embodiment of the present disclosure.

Referring to FIG. 10, a DW application 1001, a first function application 1003, and a second function application 1005 may be a module for running the DW application, a module for running an application of a first function, and a module for running an application of a second function, respectively. All of the DW application 1001, the first function application 1003, and the second function application 1005 may be installed inside the image forming apparatus 100.

The user may quickly and easily use various functions provided by the image forming apparatus 100, by selecting workflows stored in the image forming apparatus 100. For example, when the user desires to use a workflow, the user may select the workflow by running the DW application 1001. The user may access a user account of the DW application 1001 by inputting user identification information. The DW application 1001 may restrictively provide a function of generating, managing, and executing a workflow to the user according to user rights corresponding to the user account.

More specifically, the DW application 1001 may provide a list of workflows stored in the image forming apparatus 100 to the user.

In operation 1010, the DW application 1001 may acquire an execution request for any one workflow in the list. The DW application 1001 may read information about the selected workflow and execute the selected workflow. The information about the selected workflow may include the contents and an execution order of functions included in the workflow and may further include setting values corresponding to each function.

In operation 1015, the DW application 1001 may run the first function application 1003 for executing a first function.

In operation 1020, the first function application 1003 may execute the first function. If the first function has input data, the first function application 1003 may receive, from the DW application 1001, and use the input data of the first function and further receive and use setting values corresponding to the first function.

If execution of the first function is completed, in operation 1025, the first function application 1003 may transmit an execution result of the first function to the DW application 1001. For example, the execution result of the first function may include output data according to the execution of the first function and information indicating whether the first function has been successfully executed.

In operation 1030, the DW application 1001 may receive the execution result of the first function and determine whether a subsequent function to be executed exists. The DW application 1001 may determine whether a subsequent function to be executed exists, based on the execution result of the first function and information about the selected workflow.

If a second function exists as the subsequent function to be executed, in operation 1035, the DW application 1001 may run the second function application 1005 for executing the second function.

In operation 1040, the second function application 1005 may execute the second function. If the second function has input data, the second function application 1005 may receive, from the DW application 1001, and use the input data of the second function and may further receive and use setting values corresponding to the second function. The input data of the second function may be output data of the first function, which is included in the execution result of the first function.

If execution of the second function is completed, in operation 1045, the second function application 1005 may transmit an execution result of the second function to the DW application 1001. For example, the execution result of the second function may include output data according to the execution of the second function and information indicating whether the second function has been successfully executed.

In operation 1050, the DW application 1001 may receive the execution result of the second function and determine whether a subsequent function to be executed exists. If no subsequent function to be executed exists, the DW application 1001 may store an execution result of the workflow in the image forming apparatus 100 in operation 1055. The execution result of the workflow may include output data and information indicating whether the workflow has been successfully executed. The DW application 1001 may provide the execution result of the workflow to the user.

Figure 11:
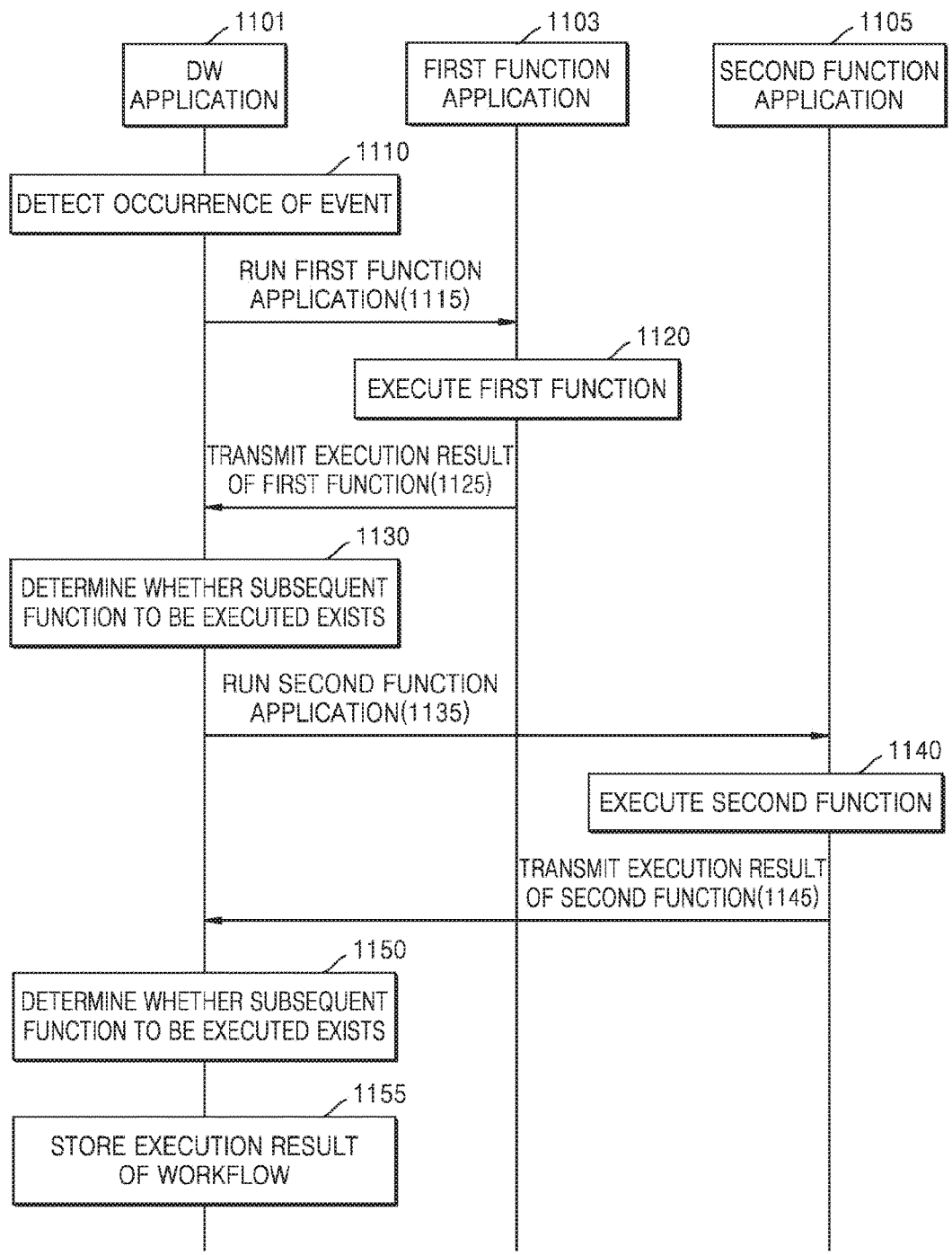
FIG. 11 illustrates a signaling diagram of a method by which an image forming apparatus executes a workflow according to an embodiment of the present disclosure.

FIG. 11 illustrates a signaling diagram of a method by which an image forming apparatus executes a workflow according to an embodiment of the present disclosure.

Referring to FIG. 11, a DW application 1101, a first function application 1103, and a second function application 1105 may be a module for running the DW application, a module for running an application of a first function, and a module for running an application of a second function, respectively. All of the DW application 1101, the first function application 1103, and the second function application 1105 may be installed inside the image forming apparatus 100.

The image forming apparatus 100 may execute a workflow including monitoring functions periodically executable without a request of the user among stored workflows. For example, the first function application 1103 may be an application for performing a toner remaining amount monitoring function, and the second function application 1105 may be an application for performing an alarm transmission function.

In operation 1110, the DW application 1101 may detect the occurrence of an event. When a predefined event occurs, the DW application 1101 may automatically execute a workflow including a first function corresponding to the predefined event in operation 1115. The predefined event may be one of events registered by the user or stored as default. The events may include an error, a lack of toner, a lack of paper, and the like which may occur in the image forming apparatus 100.

For example, if an event corresponding to the lack of toner occurs, the DW application 1101 may run the first function application 1103 for performing the toner remaining amount monitoring function. If no workflow including a function corresponding to an occurred event exists among the stored workflows, the DW application 1101 may end this job without executing a workflow.

In operation 1120, the first function application 1103 may perform the toner remaining amount monitoring function and output the monitoring result. The first function application 1103 may determine whether a monitored toner remaining amount satisfies a preset condition according to an option set when the workflow was generated. For example, the first function application 1103 may output a result indicating a lack of toner if the monitored toner remaining amount is less than a preset value and output a result indicating sufficient toner if the monitored toner remaining amount is greater than the preset value.

In operation 1125, the first function application 1103 may transmit the execution result of the toner remaining amount monitoring function to the DW application 1101.

In operation 1130, the DW application 1101 may receive the execution result of the toner remaining amount monitoring function and determine whether a subsequent function to be executed exists. If the execution result of the toner remaining amount monitoring function indicates a lack of toner, the DW application 1101 may determine whether a subsequent function to be executed exists, based on information about a corresponding workflow.

If a second function exists as the subsequent function to be executed, in operation 1135, the DW application 1101 may run the second function application 1105 for executing the alarm transmission function that is the second function.

In operation 1140, the second function application 1105 may execute the alarm transmission function. For example, the image forming apparatus 100 may transmit a message for informing of the lack of toner to the user.

If execution of the second function is completed, in operation 1145, the second function application 1005 may transmit an execution result of the second function to the DW application 1101. For example, the execution result of the second function may include information indicating whether the message has been successfully transmitted.

In operation 1150, the DW application 1101 may receive the execution result of the second function and determine whether a subsequent function to be executed exists. If no subsequent function to be executed exists, the DW application 1101 may store an execution result of the workflow in the image forming apparatus 100 in operation 1155. The execution result of the workflow may include output data and information indicating whether the workflow has been successfully executed. The DW application 1101 may provide the execution result of the workflow to the user.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

It should be understood that embodiments described herein should be considered in a descriptive sense only and not for purposes of limitation. Descriptions of features or aspects within each embodiment should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of generating a workflow of an image forming job, the method comprising:
    providing a first list of selectable first functions;
    receiving a user input for selecting a first function from the first list;
    running an application for executing the selected first function to provide a user interface (UI) for receiving setting values for the selected first function;
    storing the received setting values for the selected first function;
    determining output data of the selected first function;
    determining, based on the output data of the selected first function, a second list of selectable second functions that are continuously executable to the selected first function;
    providing the second list;
    receiving a user input for selecting a second function from the second list; and
    generating a workflow to sequentially execute the selected first function based on the received setting values for the selected first function and the selected second function,
    wherein the second list of selectable second functions is determined based on whether input data of the second functions corresponds to the output data of the selected first function.

2. The method of claim 1, wherein the providing of the first list of the selectable first functions comprises:
    acquiring metadata of applications for executing the first functions,
    analyzing the acquired metadata, and
    displaying functions that are usable for constituting the workflow as the first list of the selectable first functions.

3. The method of claim 1,
    wherein the providing of the first list comprises displaying functions for which input data is not required as the first functions based on metadata of applications for executing the corresponding functions, and
    wherein the providing of the second list comprises displaying functions for which output data is not required as the second functions based on metadata of applications for executing the corresponding functions.

4. The method of claim 3, wherein each of the metadata of the applications for executing the first functions and the metadata of the applications for executing the second functions comprises at least one of names of the corresponding functions, information about output data of the corresponding functions, information about input data of the corresponding functions, or icons of the corresponding functions.

5. The method of claim 1, wherein the providing of the second list comprises displaying functions requiring input data corresponding to output data of at least one of the first functions as the second functions.

6. The method of claim 5, wherein, in the second list, the second functions requiring the input data corresponding to the output data of the at least one of the first functions are displayed in an activated state.

7. The method of claim 1, further comprising, upon the receiving of the user input for selecting the second function from the second list:
    running an application for executing the selected second function;
    providing a UI for receiving setting values for the selected second function; and
    storing the received setting values for the selected second function,
    wherein the generating of the workflow is further based on the received setting values for the selected second function.

8. The method of claim 7, further comprising storing the workflow in one of a private storage of the user or a public storage.

9. The method of claim 8, further comprising:
    reading the stored workflow if an execution request for the stored workflow is received; and
    sequentially executing the first function and the second function included in the workflow.

10. An image forming apparatus for generating a workflow of an image forming job, the image forming apparatus comprising:
    a user interface (UI) device to:
        provide a first list of selectable first functions,
        receive, from a user, a user input for selecting a first function from the first list,
        receive, from the user, setting values for the selected first function, and
        receive, from the user, a user input for selecting a second function from a second list of selectable second functions;
    at least one processor to:
        run an application for executing the selected first function to provide a user interface (UI) for receiving the setting values for the selected first function,
        store the received setting values for the selected first function,
        determine output data of the selected first function,
        determine, based on the output data of the selected first function, the second list of selectable second functions that are continuously executable to the selected first function,
        provide the second list to the UI device, and
        generate a workflow to sequentially execute the selected first function based on the received setting values for the selected first function and the selected second function; and
    a storage to store the workflow, wherein the second list of selectable second functions is determined based on whether input data of the second functions corresponds to the output data of the selected first function.

11. The image forming apparatus of claim 10, wherein the at least one processor:
acquires metadata of applications for executing the first functions,
analyzes the acquired metadata, and
displays first functions that are usable for constituting the workflow as the first list of the selectable first functions.

12. The image forming apparatus of claim 10,
wherein the at least one processor displays functions for which input data is not required as the first functions based on metadata of applications for executing the corresponding functions, and
wherein the providing of the second list comprises displaying functions for which output data is not required as the of second functions based on metadata of applications for executing the corresponding functions.

13. The image forming apparatus of claim 12, wherein each of the metadata of the applications for executing the first functions and the metadata of the applications for executing the second functions comprises at least one of names of the corresponding functions, information about output data of the corresponding functions, information about input data of the corresponding functions, or icons of the corresponding functions.

14. The image forming apparatus of claim 10, wherein, to provide the second list, the at least one processor displays functions requiring input data corresponding to output data of at least one of the first functions as the second functions.

15. The image forming apparatus of claim 14, wherein the at least one processor displays the second functions requiring the input data corresponding to the output data of the at least one of the first functions in an activated state.

16. The image forming apparatus of claim 10,
wherein the at least one processor, upon the receiving of the user input for selecting the second function from the second list, runs an application for executing the selected second function,
wherein the UI device, upon the receiving of the user input for selecting the second function from the second list, receives setting values for the selected second function,
wherein the storage stores the received setting values for the selected second function, and wherein the generating of the workflow is further based on the received setting values for the selected second function.

17. The image forming apparatus of claim 10, wherein the storage stores the workflow in one of a private storage of the user or a public storage.

18. The image forming apparatus of claim 10, wherein the at least one processor:
reads the stored workflow if an execution request for the stored workflow is received, and
sequentially executes the first function and the second function included in the workflow.

19. A non-transitory computer-readable recording medium having recorded thereon instructions for performing a method of generating a workflow of an image forming job, the non-transitory computer-readable recording medium comprising:
instructions to provide a first list of selectable first functions;
instructions to receive a user input for selecting a first function from the first list;
instructions to run an application for executing the selected first function to provide a user interface (UI) for receiving setting values of the selected first function;
instructions to store the received setting values of the selected first function;
instructions to determine output data of the selected first function;
instructions to determine, based on the output data of the selected first function, a second list of selectable second functions that are continuously executable to the selected first function;
instructions to provide the second list;
instructions to receive a user input for selecting a second function from the second list; and
instructions to generate a workflow to sequentially execute the selected first function based on the received setting values for the selected first function and the selected second function,
wherein the second list of selectable second functions is determined based on whether input data of the second functions corresponds to the output data of the selected first function.

* * * * *